US012205324B2

(12) United States Patent
Zhuang et al.

(10) Patent No.: US 12,205,324 B2
(45) Date of Patent: Jan. 21, 2025

(54) LEARNING TO FUSE GEOMETRICAL AND CNN RELATIVE CAMERA POSE VIA UNCERTAINTY

(71) Applicant: NEC Laboratories America, Inc., Princeton, NJ (US)

(72) Inventors: Bingbing Zhuang, San Jose, CA (US); Manmohan Chandraker, Santa Clara, CA (US)

(73) Assignee: NEC Corporation, Tokyo (JP)

( * ) Notice: Subject to any disclaimer, the term of this patent is extended or adjusted under 35 U.S.C. 154(b) by 525 days.

(21) Appl. No.: 17/519,894

(22) Filed: Nov. 5, 2021

(65) Prior Publication Data

US 2022/0148220 A1   May 12, 2022

Related U.S. Application Data

(60) Provisional application No. 63/113,961, filed on Nov. 15, 2020, provisional application No. 63/111,274, filed on Nov. 9, 2020.

(51) Int. Cl.
*G06T 17/00* (2006.01)
*G06T 1/00* (2006.01)
(Continued)

(52) U.S. Cl.
CPC .............. *G06T 7/75* (2017.01); *G06T 1/0014* (2013.01); *G06T 7/77* (2017.01);
(Continued)

(58) Field of Classification Search
CPC ........... G06T 7/75; G06T 1/0014; G06T 7/77; G06T 2207/20076; G06T 2207/20081;
(Continued)

(56) References Cited

U.S. PATENT DOCUMENTS

2019/0279366 A1\*   9/2019   Sick ...................... G01S 13/867
2019/0361460 A1\*   11/2019  Medeiros ................. G05D 1/00
(Continued)

OTHER PUBLICATIONS

Laidlow et al., Towards the Probabilistic Fusion of Learned Priors into Standard Pipelines for 3D Reconstruction, 2020 (Year: 2020).\*
(Continued)

*Primary Examiner* — Siamak Harandi
*Assistant Examiner* — Mehrazul Islam
(74) *Attorney, Agent, or Firm* — Joseph Kolodka

(57) ABSTRACT

A computer-implemented method for fusing geometrical and Convolutional Neural Network (CNN) relative camera pose is provided. The method includes receiving two images having different camera poses. The method further includes inputting the two images into a geometric solver branch to return, as a first solution, an estimated camera pose and an associated pose uncertainty value determined from a Jacobian of a reproduction error function. The method also includes inputting the two images into a CNN branch to return, as a second solution, a predicted camera pose and an associated pose uncertainty value. The method additionally includes fusing, by a processor device, the first solution and the second solution in a probabilistic manner using Bayes' rule to obtain a fused pose.

20 Claims, 5 Drawing Sheets

(51) Int. Cl.
G06T 5/50 (2006.01)
G06T 7/73 (2017.01)
G06T 7/77 (2017.01)

(52) U.S. Cl.
CPC .............. G06T 2207/20076 (2013.01); G06T 2207/20081 (2013.01); G06T 2207/20084 (2013.01); G06T 2207/20221 (2013.01); G06T 2207/30244 (2013.01)

(58) Field of Classification Search
CPC . G06T 2207/20084; G06T 2207/20221; G06T 2207/30244; G06T 2207/20072; G06T 7/70; G06N 3/045; G06N 7/01
See application file for complete search history.

(56) References Cited

U.S. PATENT DOCUMENTS

| | | | |
|---|---|---|---|
| 2020/0013188 A1* | 1/2020 | Nakashima | G06N 3/045 |
| 2020/0106942 A1* | 4/2020 | Jiang | G06T 5/50 |
| 2020/0273190 A1* | 8/2020 | Ye | G06T 7/579 |

OTHER PUBLICATIONS

Hedborg et al., Towards the Probabilistic Fusion of Learned Priors into Standard Pipelines for 3D Reconstruction, 2012 (Year: 2012).*
Kendall et al., Modelling Uncertainty in Deep Learning for Camera Relocalization, 2016 (Year: 2016).*
Klodt, Maria, et al. "Supervising the new with the old: learning SFM from SFM", InProceedings of the European Conference on Computer Vision (ECCV). Sep. 2018, pp. 698-713.
Nister, David, et al. "An efficient solution to the five-point relative pose problem", IEEE transactions on pattern analysis and machine intelligence, vol. 26, No. 6. Jun. 2004, pp. 756-770.
Y. Nakajima et al., "Fast and Accurate Semantic Mapping Through Geometric-based Incremental Segmentation", 2018 IEEE/RSJ International Confernce on Intelligent Robots and System (IROS), Jan. 7, 2019, pp. 385-388.
T.D. Barfoot et al., "Associating Uncertainty With Three-Dimensional Poses for Use in Estimation Problems", IEEE Transactions on Robotics, vol. 30, issue 3, Jan. 28, 2014, pp. 682, 686, 688, 690.
A. Vakhitov et al., "Stereo Relative Pose From Line and Point Feature Triplets", arXiv:1907.00276v1, Jun. 2019, pp. 1, 10.
G. Stienne et al., "A multi-temporal multi-sensor circular fusion filter", Information Fusion 18, pp. 86-100, Jun. 2013, pp. 93, 97-98.

* cited by examiner

LEARNING TO FUSE GEOMETRICAL AND CNN RELATIVE CAMERA POSE VIA UNCERTAINTY

RELATED APPLICATION INFORMATION

This application claims priority to U.S. Provisional Patent Application No. 63/111,274, filed on Nov. 9, 2020, and U.S. Provisional Patent Application No. 63/113,961, filed on Nov. 15, 2020, incorporated herein by reference in their entireties.

BACKGROUND

Technical Field

The present invention relates to imaging and more particularly to learning to fuse geometrical and Convolutional Neural Network (CNN) relative camera pose via uncertainty.

Description of the Related Art

Structure-from-Motion (SfM) has been one of the oldest central problems in the field of computer vision. In particular, relative camera pose estimation from two perspective views remains the essential first step that under-pins the success of the whole SfM pipeline. Hence, there is a need for a way to determine relative camera pose from two perspective views.

SUMMARY

According to aspects of the present invention, a computer-implemented method for fusing geometrical and Convolutional Neural Network (CNN) relative camera pose is provided. The method includes receiving two images having different camera poses. The method further includes inputting the two images into a geometric solver branch to return, as a first solution, an estimated camera pose and an associated pose uncertainty value determined from a Jacobian of a reproduction error function. The method also includes inputting the two images into a CNN branch to return, as a second solution, a predicted camera pose and an associated pose uncertainty value. The method additionally includes fusing, by a processor device, the first solution and the second solution in a probabilistic manner using Bayes' rule to obtain a fused pose.

According to other aspects of the present invention, a computer program product for fusing geometrical and Convolutional Neural Network (CNN) relative camera pose is provided. The computer program product includes a non-transitory computer readable storage medium having program instructions embodied therewith. The program instructions are executable by a computer to cause the computer to perform a method. The method includes receiving, by a processor device of the computer, two images having different camera poses. The method further includes inputting, by the processor device, the two images into a geometric solver branch to return, as a first solution, an estimated camera pose and an associated pose uncertainty value determined from a Jacobian of a reproduction error function. The method also includes inputting, by the processor device, the two images into a CNN branch to return, as a second solution, a predicted camera pose and an associated pose uncertainty value. The method additionally includes fusing, by the processor device, the first solution and the second solution in a probabilistic manner using Bayes' rule to obtain a fused pose.

According to yet other aspects of the present invention, a computer processing system for fusing geometrical and Convolutional Neural Network (CNN) relative camera pose is provided. The computer processing system includes a memory device for storing program code. The computer processing system further includes a processor device operatively coupled to the memory device for running the program code to receive two images having different camera poses. The processor device further runs the program code to input the two images into a geometric solver branch to return, as a first solution, an estimated camera pose and an associated pose uncertainty value determined from a Jacobian of a reproduction error function. The processor device also runs the program code to input the two images into a CNN branch to return, as a second solution, a predicted camera pose and an associated pose uncertainty value. The processor device additionally runs the program code to fuse the first solution and the second solution in a probabilistic manner using Bayes' rule to obtain a fused pose.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to learning to fuse geometrical and Convolutional Neural Network (CNN) relative camera pose via uncertainty.

Embodiments of the present invention provide a method for two-view relative pose estimation, including relative rotation and translation direction, taking two images as input. Embodiments of the present invention can be applied in any platform or system that requires SfM, such as an Advanced Driver-Assistance System (ADAS), an Augmented Reality/Virtual Reality (AR/VR) system, and so forth.

Embodiments of the present invention use an uncertainty based probabilistic framework to fuse the geometric and CNN prediction. The intuition underlying a pipeline in accordance with the present invention is that, due to its well-understood rationale, the geometric solution is trusted if it is highly confident, whereas for those geometrically ill-conditioned cases, the network should play a role in driving the solution closer to the true one. Therefore, uncertainty-based probabilistic fusion of the two comes into play as the correct way to achieve this goal. On one hand, the geometric uncertainty obtained via the Jacobian of the error functions serves as an indicator of the quality of the solution. On the other hand, the network is designed to additionally predict the uncertainty associated with the camera pose prediction. The uncertainty so obtained could be interpreted as (co)variance of a Gaussian distribution, and this allows fusing the two predictions using Bayes' theorem. The network architecture is also novel in the sense of the effectiveness of a self-attention mechanism in the problem of relative pose estimations. The attention mechanism is implemented into a graph neural network to exact useful knowledge from input keypoint correspondences. This contributes significantly to improved accuracy.

Figure 1:
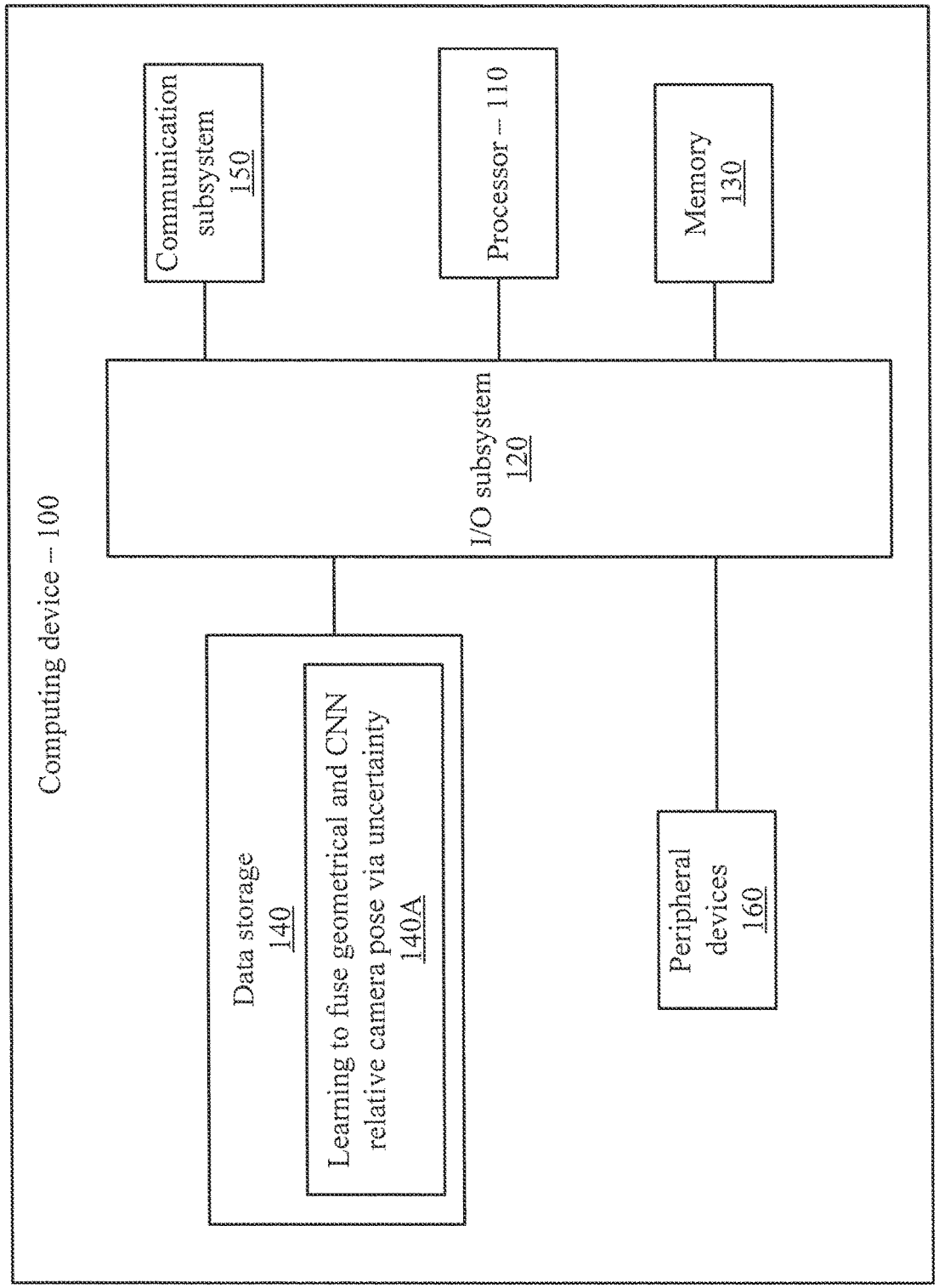
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform learning to fuse geometrical and CNN relative camera pose via uncertainty.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for learning to fuse geometrical and CNN relative camera pose via uncertainty. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
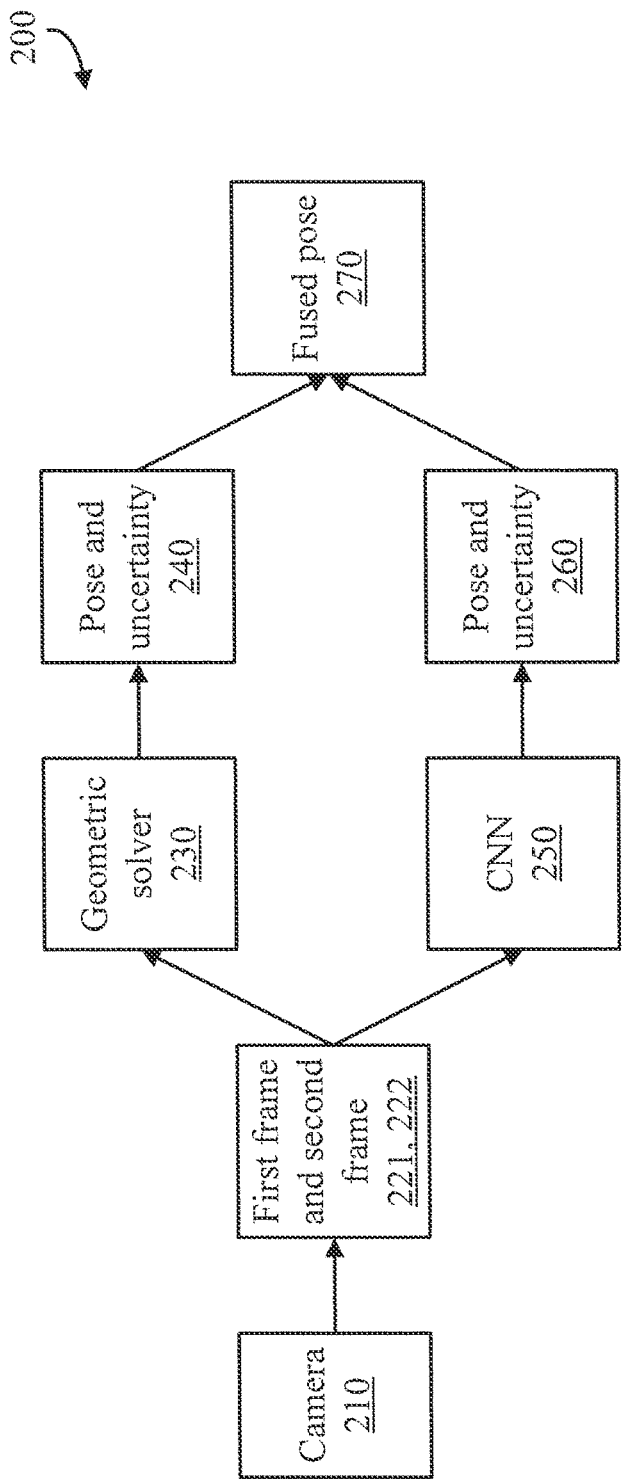
FIG. 2 is a block diagram showing an exemplary probabilistic fusion pipeline, in accordance with an embodiment of the present invention.

These and other variations of a hardware processor subsystem are also contemplated in accordance with embodiments of the present invention FIG. 2 is a block diagram showing an exemplary probabilistic fusion pipeline 200, in accordance with an embodiment of the present invention.

The probabilistic fusion pipeline 200 includes a camera 210, a first frame 221 and a second frame 222, a 5-point solver and Bundle Adjustment (BA) module 230, a pose and uncertainty 240 output from the geometric method, a CNN 250, a pose and uncertainty 260 output from the CNN method and a fused pose 270 as output.

The camera 210 captures two images 221 and 222 under different camera poses. The images 221 and 222 are first feed into the classical geometric solver 230, including the 5-point minimal solver and Bundle Adjustment. An estimated camera pose 240, as well as the associated uncertainty obtained from a Jacobian of the reprojection error function, are returned. Similarly, the image pair is also feed into a convolutional neural network to predict both camera pose and uncertainty. The above two solutions are then fused in a probabilistic manner using Bayes' rule to obtain a fused pose 270.

The probabilistic fusion pipeline 200 takes as input two images captured by a camera at different viewpoints. The image pair is then passed into two branches, including a geometric branch 291 and a CNN branch 292. In the geometric branch 291, the classical 5-point minimal solver is applied followed by the golden-standard Bundle Adjustment to compute the camera pose. In addition, the associated uncertainty is obtained by computing the Jacobian of the nonlinear least squares evaluated at the optimum. In the CNN branch 292, the network is designed to predict camera pose as well as the uncertainty. Specifically, the present invention parameterizes the translation direction by azimuth angle $\alpha$ and elevation angle $\beta$, and the rotation by Euler angle include yaw $\theta_y$, pitch $\theta_p$ and roll $\theta_r$. Each parameter is fused separately for the sake of convenience. The fusion is achieved in a probabilistic manner. In particular, the estimated camera pose parameter and uncertainty are interpreted as the mean and variance of an underlying Gaussian distribution. The Gaussians of the geometric and CNN predictions are denoted as $N(x_g, \sigma_g)$ and $N(x_c, \sigma_c)$, respectively. The fused Gaussian is then $$N(x_f, \sigma_f), \text{ where } x_f = \frac{\sigma_g^{-1} x_g + \sigma_c^{-1} x_c}{\sigma_g^{-1} + \sigma_c^{-1}}, \text{ and } \sigma_f = (\sigma_g^{-1} + \sigma_c^{-1})^{-1}.$$

Lastly, $x_f$ is returned as the final fused prediction.

A description will now be given regarding motivation provided for the present invention in consideration of limitations of the geometrical solver.

Despite its well-established theoretical foundation, the classical geometrical solvers still face various challenges and our paper purports to leverage CNN for more accurate estimation under such cases.

Correspondences. The correspondence between two views have been the cornerstone of the geometrical solvers ever since. This heavy reliance on correspondences yet indicates degraded performance under the scarcity of correspondences.

Degeneracy. The geometric performance also drops when it approaches inherently degenerate configurations. One typical example is when most of the keypoints lie on a certain 3D plane.

Rotation versus Translation. Translation estimates are far more sensitive than rotation; various issues in SfM are related to translation such as the familiar forward motion bias in linear methods if proper normalization is not carried out. Thus, one would naturally like to trust the rotation solution more in the geometric solution, whereas expect CNN to play a more significant role in the translation.

Bas-relief Ambiguity. B as-relief ambiguity, a.k.a. rotation translation ambiguity, rears its ugly head once the camera is undergoing sideway motion. This is due to the resemblance between translational and rotational flow under limited field of view, such confounding resulting in difficulty to distinguish one from the other and hence less accurate pose estimation.

Forward Motion. Forward motion also constantly poses challenges to SfM, partially because of the vanishing feature movement near the focus of the expansion at image center, and partially because of the presence of a plethora of local minima in the least squares error landscape.

A description will now be given regarding geometric uncertainty, in accordance with an embodiment of the present invention.

Geometric solution. Formally, embodiments of the present invention are interested in solving the relative camera pose between two cameras $C_1$ and $C_2$ with known intrinsics. Specifically, taking $C_1$ as the reference with camera pose denoted as $P_1 = [I \ 0]$, the problem is defined as solving the relative camera pose of $C_2$, denoted as $P_2 = [R \ t]$, where $R \in SO(3)$ and $t \in S^2$ denote the relative rotation and translation direction, respectively. Suppose both cameras are viewing a set of common 3D points $X_i$, $i=1, 2, \ldots, n$, each yielding a pair of 2D correspondences $x_i^1$ and $x_i^2$ in the image plane. It is well-known that a minimal set of 5-point correspondences suffices to determine the solution, with Nister's 5-point algorithm being the standard minimal solver. A RANSAC procedure is usually applied to obtain an initial solution, and triangulation follows to obtain 3D points $X_i$. Finally, one could refine the solution by nonlinearly minimizing the reprojection error, a.k.a. Bundle Adjustment, $$\min_\theta \sum_i \|(x_i^1 - \pi(P_1, X_i))\|^2 + \| x_i^2 - \pi(P_2, X_i))\|^2, \quad (1)$$

where $\pi(\ )$ denotes the standard perspective projection and $\theta = \{\theta_R, \theta_t, X_i, i=1, 2, \ldots n\}$. $\theta_R$ and $\theta_t$ represent the parameterization of rotation and translation.

Uncertainty. In order to describe the uncertainty associated with the optimum in a probabilistic manner, the distribution of $\theta$ could be approximated locally by a Gaussian distribution $N(\theta|\hat{\theta}, \Sigma)$. As a first-order approximation, the information matrix $\Lambda$, i.e. $\Sigma^{-1}$, is computed via Jacobian, i.e., $$\Lambda = J^T(\hat{\theta}) J(\hat{\theta}),$$

where $J(\hat{\theta})$ denotes the Jacobian of the nonlinear least squares (Equation 1) at $\hat{\theta}$. It is noted that $J(\hat{\theta})$ is of full rank herein, implying the absence of gauge ambiguity. This is attributed to the fixed camera pose of $C_1$ as well as our minimal parameterizations of $(R, t)$ to be discussed shortly. In addition, fusion is conducted on each individual parameter in $\{\theta_R, \theta_t\}$ separately due to the discontinuity in representation, and the present invention will be described with respect to inverse variance for convenience. To proceed, the inverse variance $\sigma_i^{-1}$ of a parameter $\theta_i$ in $\{\theta_R, \theta_t\}$ could be obtained by Schur complement as follows:

$$\sigma_i^{-1} = \Lambda \backslash \Lambda_{J,J} = \Lambda_{i,i} - \Lambda_{i,J} \Lambda_{J,J}^{-1} \Lambda_{J,i},$$

where $J$ includes the index to all the rest of the parameters in $\theta$. This step is also called S-transformation that purports to specify the gauge of covariance matrix. From the probabilistic point of view, it is essentially the conditional variance of $\theta_i$ given all the other parameters.

As one might notice, we do not consider the keypoint localization uncertainty of $x_i^{1,2}$ herein for the sake of simplicity.

A description will now be given regarding geometric-CNN pose fusion via uncertainty, in accordance with an embodiment of the present invention.

Figure 3:
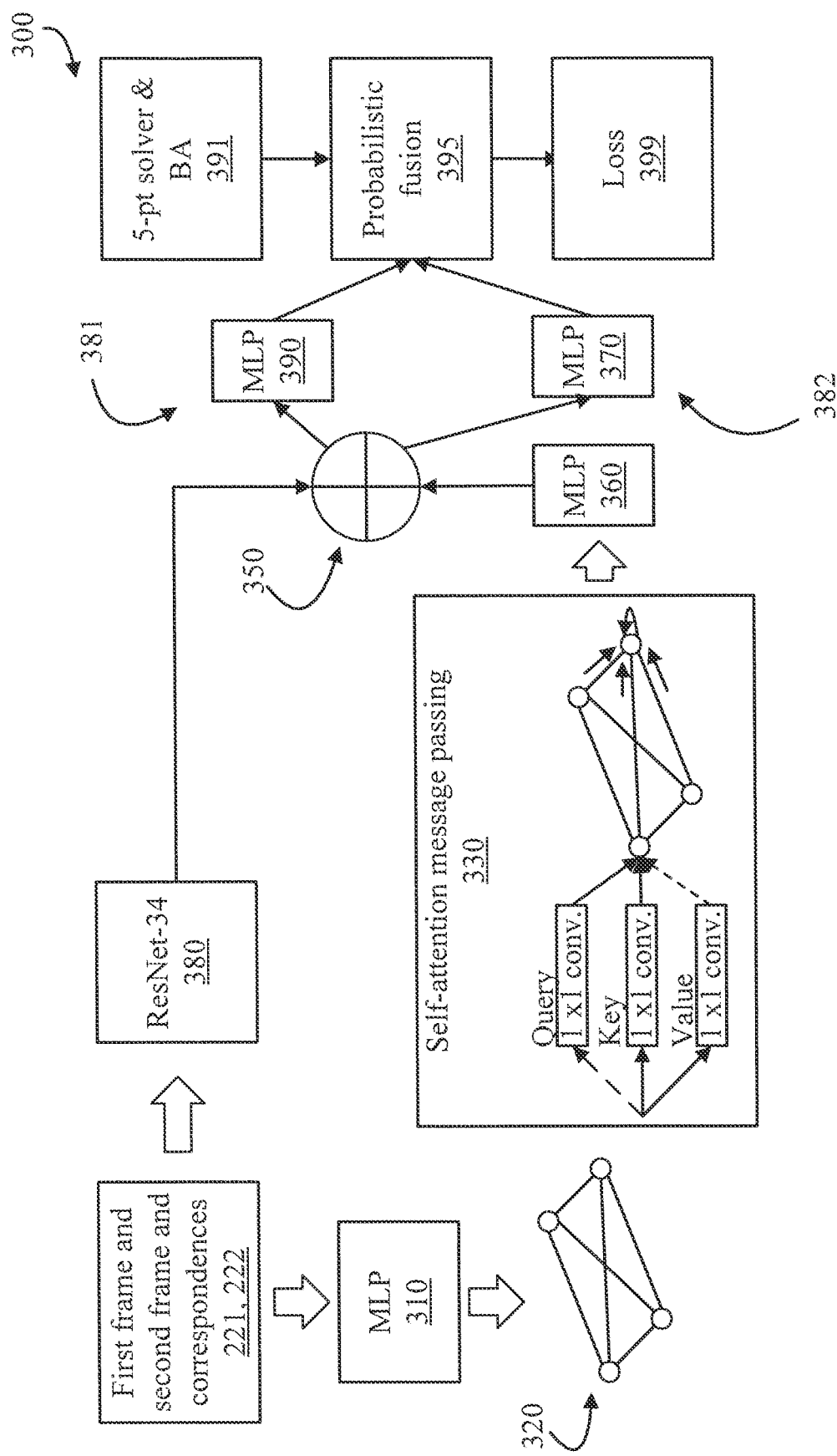
FIG. 3 is a block diagram showing an exemplary geometric-CNN pose fusion framework, in accordance with an embodiment of the present invention.

FIG. 3 is a block diagram showing an exemplary geometric-CNN pose fusion framework 300, in accordance with an embodiment of the present invention.

The present invention takes as input the image pair along with the correspondences extracted by a feature extractor and matcher. The two images 221, 222 are stacked and passed to a ResNet architecture 380 to extract the appearance feature. The corresponding keypoint locations are embedded through an MLP 310. The resultant embedding features form a fully connected graph 320, which is fed into an attentional graph neural network 330 and an MLP 360 to extract the geometric feature. Afterwards, the appearance and geometric features are concatenated 350 before being passed to the pose branch 381 and the uncertainty branch 382, which predict the mean and inverse variance of the underlying Gaussian distribution of the motion parameters, via Multilayer Perceptrons (MLPs) 390, 370. These are then fused with the geometric solution 391 based on uncertainty 395, yielding the final output that receives the supervision signal (loss) 399.

It is desired to highlight the significance of the ResNet in that it offers the global appearance context for the network to reason about the camera motion. This is very much complementary to traditional geometric approaches that only reply on keypoint correspondences, if available at all. The purposes of the present invention's graph neural network and geometric feature are two-fold. First, the correspondences, if available, do encode strong geometric cues that could be leveraged by the network to reason about camera motion. Second, as opposed to appearance, correspondences as the sole input to the 5-point solver and BA, have a more explicit correlation with the uncertainty of geometric solution. This facilitates the network to decide the extent to which the geometric solution should be trusted.

Probabilistic Geometric-CNN Pose Fusion. In order to fuse the geometric and CNN predictions, one could conceptually treat them as measurements from two different sensors, which leads to the natural application of traditional sensor fusion strategies—a principled way to sensor fusion is by means of Bayes Law akin to a Kalman filter. Specifically, the posterior of a motion parameter $\theta_i$ reads as follows:

$$P(\theta_i | \hat{\theta}_{g,i}, \sigma_{g,i}, \hat{\theta}_{c,i}, \sigma_{c,i}) \propto P(\theta_i) N(\theta_i | \hat{\theta}_{g,i}, \sigma_{g,i}) N(\theta_i | \hat{\theta}_{c,i}, \sigma_{c,i}),$$

where $(\hat{\theta}_{g,i}, \sigma_{g,i})$ and $(\hat{\theta}_{c,i}, \sigma_{c,i})$ respectively denote the geometric and CNN prediction. Assuming non-informative prior $P(\theta_i)$, it can be shown that $$P(\theta_i | \hat{\theta}_{g,i}, \sigma_{g,i}, \hat{\theta}_{c,i}, \sigma_{c,i}) = N(\theta_i | \hat{\theta}_{f,i}, \sigma_{f,i}),$$

$$\hat{\theta}_{f,i} = \frac{\sigma_{g,i}^{-1} \hat{\theta}_{g,i} + \sigma_{c,i}^{-1} \hat{\theta}_{c,i}}{\sigma_{g,i}^{-1} + \sigma_{c,i}^{-1}}, \sigma_{f,i} = (\sigma_{g,i}^{-1} + \sigma_{c,i}^{-1})^{-1}$$

It follows that $\hat{\theta}_{f,i}$ is the maximum-a-posterior (MAP) estimator after fusion. One observes that it essentially boils down to a weighted average depending upon the confidence (inverse variance) of each prediction.

Motion Parameterization

Here, we discuss various subtleties to choose the proper motion parameterization.

Translation. The present invention considers for translation direction the following two distinct parameterizations, $$t(t_x, t_y, t_z) = \frac{[t_x, t_y, t_z]^T}{\|[t_x, t_y, t_z]^T\|^2},$$

and $$t(\alpha, \beta) = (\cos \alpha, \sin \alpha \cos \beta, \sin \alpha \sin \beta),$$

where $\alpha \in [0, \pi]$ and $\beta \in [-\pi, \pi]$; although any $\beta + 2 k\pi$ gives the same $t$, this constraint is applied for uniqueness. It is sought to fuse the parameters $(t_x, t_y, t_z)$ or $(\alpha, \beta)$. Further, it is also clear that the scale of $(t_x, t_y, t_z)$ is indeterminate, causing the gauge ambiguity and rank-deficient Jacobian. The present invention therefore opts for $(\alpha, \beta)$ as the fusion quantity, i.e., $\theta_t = \{\alpha, \beta\}$. However, due to its circular nature, the warp-around of $\beta$ at $\pm \pi$ leads to discontinuity in the representation; this is not desired in optimization and might cause difficulty in training if the network predicts $\beta$ directly. To address this issue, the network is designed to output $(t_x, t_y, t_z)$ followed by normalization to be of unit-norm, and afterwards $(\alpha, \beta)$ is extracted from therein.

Figure 4:
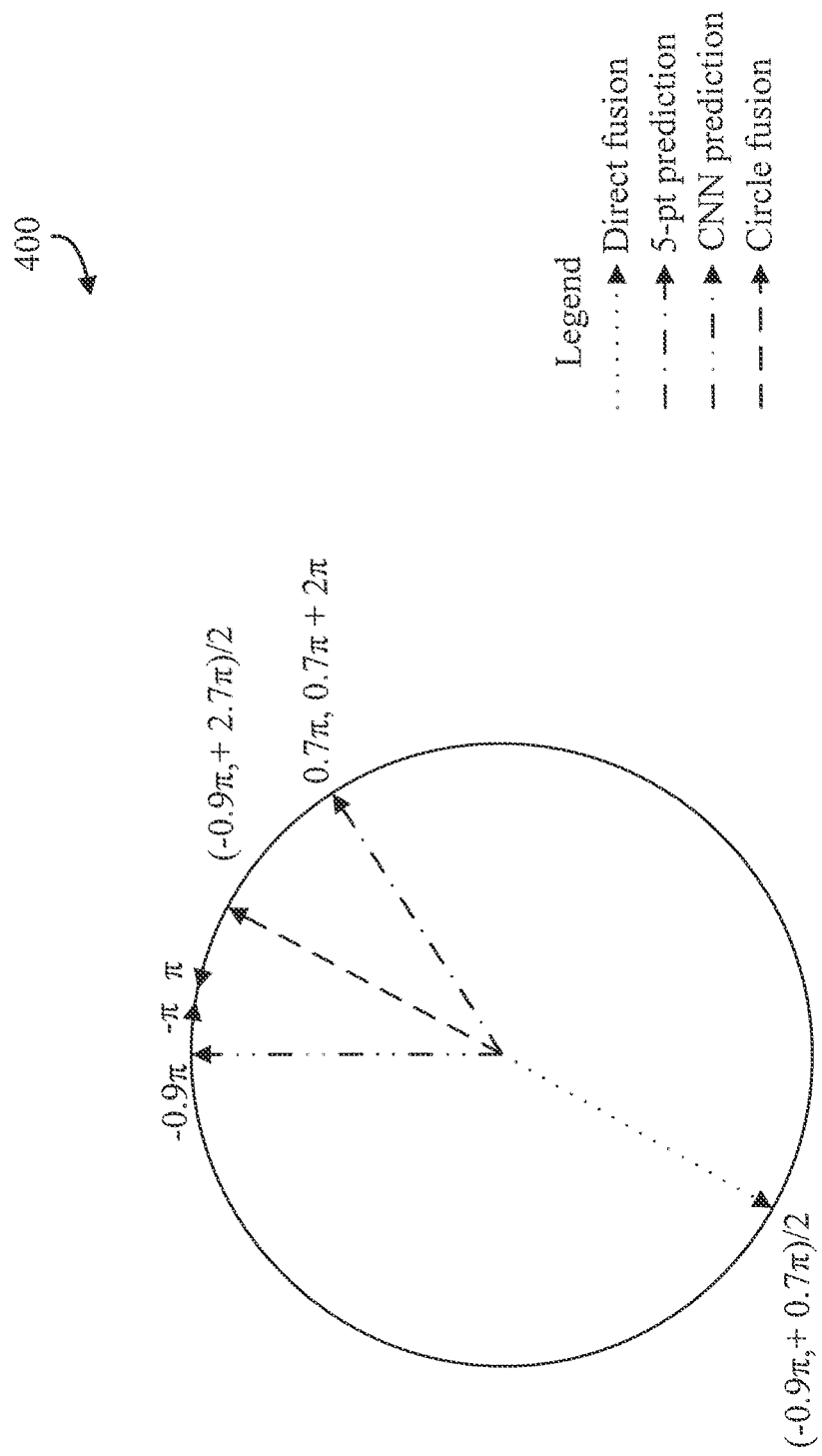
FIG. 4 is a diagram showing a toy-example illustration of circle fusion, in accordance with an embodiment of the present invention.

Circular Fusion. While the fusion of $\alpha$ remains straightforward, the circular nature slightly complicates the fusion of $\beta$. Ideally, the meaningful fusion is obtained only when $|\beta_c - \beta_g| > \pi$, which could be achieved by letting $\bar{\beta}_g = \beta_g + 2 k\pi$ with $k \in \{-1, 0, 1\}$. The best way to understand this is by looking at a toy example. FIG. 4 is a diagram showing a toy-example illustration of a circle fusion 400, in accordance with an embodiment of the present invention. As illustrated in FIG. 4, depending upon the specific values of $B_g$ and $B_c$, a direct fusion of the two might yield a solution far from both when $|\beta_c - \beta_g| > \pi$. This is however addressed by fusing $\beta_c$ and $\bar{\beta}_g$ instead. This procedure is referred to as circular fusion.

Rotation. The present invention considers two minimal 3-parameter representation of rotation—angle-axis representation and Euler angles. The network is designed to regress the angle directly. Although this also faces discontinuity at $\pm \pi$, it however is not as much of a problem as it could be. This is because, rotations between two views in practice are often far from $\pm \pi$ as strong rotation quickly diminishes the overlapping field of view. Similar performance has been observed from the two representations, but embodiments of the present invention opt for Euler angles since its fusion of roll-pitch-yaw angles has a clearer geometric meaning.

Self-Attention Graph Neural Network

Network Architecture. As the network input, the correspondences $(x_i^1, x_i^2)$ between two views are stacked as $x^{12} \in R^{m \times 4}$, which are subsequently passed to a MLP for embedding, yielding $f^{(0)}$. Next, $f^{(0)}$ is passed to iterative message passing layers to propagate information between all pairs of correspondences. A similar network as in SuperGlue was adopted for this step due to its extensively proved success. Specifically, in the l-th layer, the feature vector $f_i^l$ associated with the i-th pair of correspondence is updated as follows $f_i^{l+1} = f_i^l + \text{MLP}([f_i^l, m_i^l])$, (9) where [. , .] indicates concatenation. $m_i^l$ denotes the message aggregated from all the correspondences based on the self-attention mechanism. As per the standard procedure, we first define the Query $(Q^l)$, Key $(K^l)$ and Value $(V^l)$ as linear projections of $f^l$, each with their own learnable parameters shared across all the correspondences. The message $m^l$ is then computed as $$m^l = \text{Softmax}\left(\frac{Q^l K^{lT}}{\sqrt{d_f}}\right) V^l,$$

where $d_f$ denotes the feature dimension. The softmax is performed row wise and $m_i^l$ is the i-th row of $m^l$.

Reasoning for self-attention First, it is well-known from classical geometry that each correspondence alone does not determine the camera pose, but rather all the points (n>=5) together contribute to the solution. Therefore, the network design should encourage strong interaction between different pairs of correspondences in a tightly-coupled manner. Second, it is also known in classical SfM that the spatial distribution of the keypoints leads to different level of perspective effect and this very much affects the well-posedness of motion estimation. For instance, one common rule of thumb is that the keypoints are desired to be far from each other and widely spread in the image plane, which effectively makes full use of the field of view and prevents the degradation of perspective to affine camera model. Another factor towards preventing affine degradation arises from strong depth variance among different keypoints. Hence, the keypoints are expected to pay varying attentions to the others in order to find the best cousins that together can contribute the most to the final pose estimation. It then becomes clear now that a self-attention mechanism naturally stands out as a means to the ends discussed above—enforcing extensive interaction and permits different attentions between each other.

Figure 5:
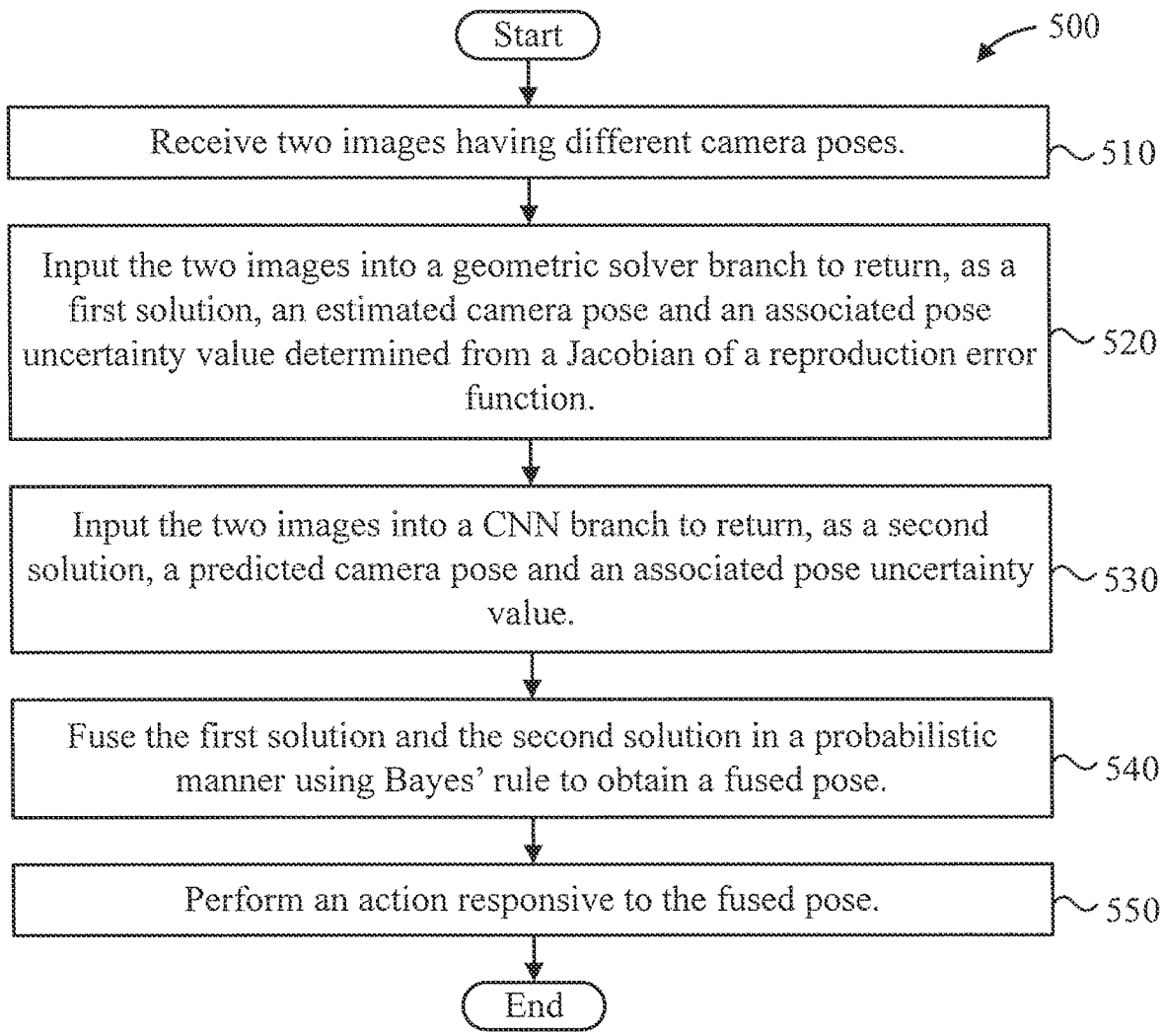
FIG. 5 is a flow diagram showing an exemplary method for fusing geometrical and Convolutional Neural Network (CNN) relative camera pose.

FIG. 5 is a flow diagram showing an exemplary method 500 for fusing geometrical and Convolutional Neural Network (CNN) relative camera pose.

At block 510, receive two images having different camera poses.

At block 520, input the two images into a geometric solver branch to return, as a first solution, an estimated camera pose and an associated pose uncertainty value determined from a Jacobian of a reproduction error function.

At block 530, input the two images into a CNN branch to return, as a second solution, a predicted camera pose and an associated pose uncertainty value.

At block 540, fuse the first solution and the second solution in a probabilistic manner using Bayes' rule to obtain a fused pose.

At block 550, perform an action responsive to the fused pose. In an embodiment, actions that can be performed with the fused pose include, but are not limited to, camera pose localization and 3D reconstruction in an augmented reality session, or ego-motion estimation in an autonomous robot. The motion estimation can be used to control a next action of the robot for accident/obstacle avoidance.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for fusing geometrical and Convolutional Neural Network (CNN) relative camera pose, comprising:
  receiving two images having different camera poses;
  inputting the two images into a geometric solver branch to return, as a first solution, an estimated camera pose and an associated pose uncertainty value determined from a Jacobian of a reproduction error function;
  inputting the two images into a CNN branch, having a pose branch multi-layer perceptron (MLP) and an uncertainty branch MLP, to return, as a second solution, a predicted camera pose by the pose branch MLP and an associated pose uncertainty value predicted by the uncertainty branch MLP by extracting appearance features with a feature extractor and geometric features with an attentional graph neural network and a geometric feature MLP; and fusing, by a processor device, the first solution and the second solution in a probabilistic manner based on the uncertainty predictions using Bayes' rule to obtain a fused pose.

2. The computer-implemented method of claim 1, wherein the geometric solver branch comprises a correspondence point minimal solver.

3. The computer-implemented method of claim 1, wherein the geometric solver branch performs a Bundle Adjustment process to nonlinearly minimize a reprojection error.

4. The computer-implemented method of claim 1, wherein the CNN branch parameterizes a translation direction of the predicted camera pose by an azimuth angle and an elevation angle.

5. The computer-implemented method of claim 1, wherein the predicted camera pose and the pose uncertainty value are interpreted as a mean and a variance, respectively, of an underlying Gaussian distribution.

6. The computer-implemented method of claim 5, further comprising concatenating the appearance and the geometric features extracted from the two images prior to predicting the mean and inverse variance of the underlying Gaussian distribution.

7. The computer-implemented method of claim 1, wherein said fusing step uses circular fusion based on parameters of a circle.

8. The computer-implemented method of claim 1, wherein said fusing step comprising performing a weighted averaging of the first solution and the second solution based on parameters of a circle.

9. The computer-implemented method of claim 1, further comprising performing robotic movement control using the fused pose.

10. A computer program product for fusing geometrical and Convolutional Neural Network (CNN) relative camera pose, the computer program product comprising a non-transitory computer readable storage medium having program instructions embodied therewith, the program instructions executable by a computer to cause the computer to perform a method comprising:
receiving, by a processor device of the computer, two images having different camera poses;
inputting, by the processor device, the two images into a geometric solver branch to return, as a first solution, an estimated camera pose and an associated pose uncertainty value determined from a Jacobian of a reproduction error function;
inputting, by the processor device, the two images into a CNN branch, having a pose branch multi-layer perceptron (MLP) and an uncertainty branch MLP, to return, as a second solution, a predicted camera pose by the pose branch MLP and an associated pose uncertainty value predicted by the uncertainty branch MLP by extracting appearance features with a feature extractor and geometric features with an attentional graph neural network and a geometric feature MLP; and
fusing, by the processor device, the first solution and the second solution in a probabilistic manner based on the uncertainty predictions using Bayes' rule to obtain a fused pose.

11. The computer program product of claim 10, wherein the geometric solver branch comprises a correspondence point minimal solver.

12. The computer program product of claim 10, wherein the geometric solver branch performs a Bundle Adjustment process to nonlinearly minimize a reprojection error.

13. The computer program product of claim 10, wherein the CNN branch parameterizes a translation direction of the predicted camera pose by an azimuth angle and an elevation angle.

14. The computer program product of claim 13, further comprising concatenating the appearance and the geometric features extracted from the two images prior to predicting the mean and inverse variance of the underlying Gaussian distribution.

15. The computer program product of claim 10, wherein the predicted camera pose and the pose uncertainty value are interpreted as a mean and a variance, respectively, of an underlying Gaussian distribution.

16. The computer program product of claim 10, wherein said fusing step uses circular fusion based on parameters of a circle.

17. The computer program product of claim 10, wherein said fusing step comprising performing a weighted averaging of the first solution and the second solution based on parameters of a circle.

18. The computer program product of claim 10, wherein the method further comprises performing robotic movement control using the fused pose.

19. A computer processing system for fusing geometrical and Convolutional Neural Network (CNN) relative camera pose, comprising:
a memory device for storing program code; and
a processor device operatively coupled to the memory device for running the program code to:
receive two images having different camera poses;
input the two images into a geometric solver branch to return, as a first solution, an estimated camera pose and an associated pose uncertainty value determined from a Jacobian of a reproduction error function;
input the two images into a CNN branch, having a pose branch multi-layer perceptron (MLP) and an uncertainty branch MLP, to return, as a second solution, a predicted camera pose by the pose branch MLP and an associated pose uncertainty value predicted by the uncertainty branch MLP by extracting appearance features with a feature extractor and geometric features with an attentional graph neural network and a geometric feature MLP; and
fuse the first solution and the second solution in a probabilistic manner based on the uncertainty predictions using Bayes' rule to obtain a fused pose.

20. The computer processing system of claim 19, wherein the geometric solver branch comprises a correspondence point minimal solver.

* * * * *